(12) United States Patent
Richter et al.

(10) Patent No.: US 6,293,420 B1
(45) Date of Patent: Sep. 25, 2001

(54) FUEL TANK

(75) Inventors: Benno Richter, St. Augustin; Michael Acker, Asbach, both of (DE)

(73) Assignee: Kautex Textron GmbH & Co., KG., Bonn (DE)

( * ) Notice: Subject to any disclaimer, the term of this patent is extended or adjusted under 35 U.S.C. 154(b) by 0 days.

(21) Appl. No.: 09/427,222

(22) Filed: Oct. 26, 1999

Related U.S. Application Data

(63) Continuation-in-part of application No. 09/116,756, filed on Jul. 16, 1998, now abandoned.

(30) Foreign Application Priority Data

Jul. 25, 1997 (DE) ................................ 197 31 912

(51) Int. Cl.[7] .................................................. B65D 25/02
(52) U.S. Cl. ......................... 220/563; 220/564; 220/501
(58) Field of Search ..................................... 220/563, 564, 220/562, 501; 137/571, 574, 576

(56) References Cited

U.S. PATENT DOCUMENTS

| 2,719,583 | * | 10/1955 | Malick . | |
|---|---|---|---|---|
| 3,020,950 | * | 2/1962 | Schraivogel . | |
| 3,049,171 | * | 8/1962 | Neuerburg et al. . | |
| 3,905,506 | | 9/1975 | Gallay | 220/563 |
| 4,354,521 | | 10/1982 | Harde | 220/563 |
| 4,397,333 | * | 8/1983 | Liba et al. | 137/574 |
| 4,503,885 | * | 3/1985 | Hall | 137/574 |
| 4,842,006 | * | 6/1989 | Scheurenbrand et al. | 137/202 |
| 4,858,778 | | 8/1989 | Patrick | 220/563 |
| 4,928,657 | * | 5/1990 | Asselin | 123/514 |
| 4,964,531 | * | 10/1990 | Caniglia et al. | 220/501 |
| 5,221,021 | | 6/1993 | Danna | 220/563 |

FOREIGN PATENT DOCUMENTS

| 2847117 | 5/1980 | (DE) . | |
|---|---|---|---|
| 296 06 124 | 8/1996 | (DE) . | |
| 0086425 | 8/1983 | (EP) . | |
| 0775606 | 5/1997 | (EP) . | |
| 510383 | 8/1939 | (GB) | 220/563 |
| 2236288 | 4/1991 | (GB) . | |
| 8-156617 | 6/1996 | (JP) . | |
| 92/03359 | 3/1992 | (WO) . | |

\* cited by examiner

Primary Examiner—Stephen Castellano
(74) Attorney, Agent, or Firm—Drinker Biddle & Reath LLP

(57) ABSTRACT

A fuel tank for a motor vehicle is provided in its interior with a component for reducing fuel surge movements. To avoid troublesome noises produced by fuel movement the component comprises a wall element at a spacing from the end of the tank that is the front end or the rear end in the direction of travel. The wall element extends at least over a substantial part of the height and the width of the tank and is so shaped that the wall element surfaces extend at least predominantly not in planes which extend perpendicularly to the direction of travel, to prevent fuel from impacting unimpededly against those surfaces perpendicularly thereto. Those surfaces thus represent divisions in the fuel tank. The volume of the fuel between the wall element and the respective tank wall surface to be shielded is not sufficient to produce noises which are a nuisance when travel movements occur.

21 Claims, 4 Drawing Sheets

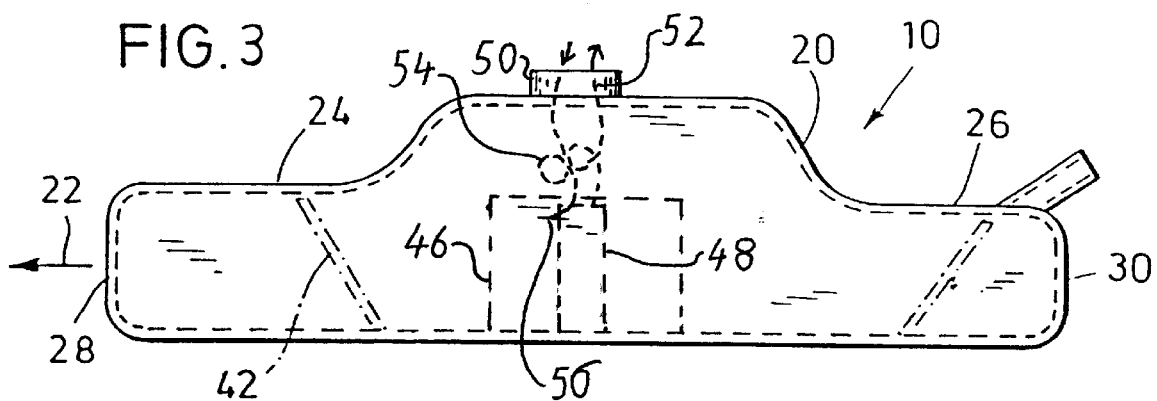
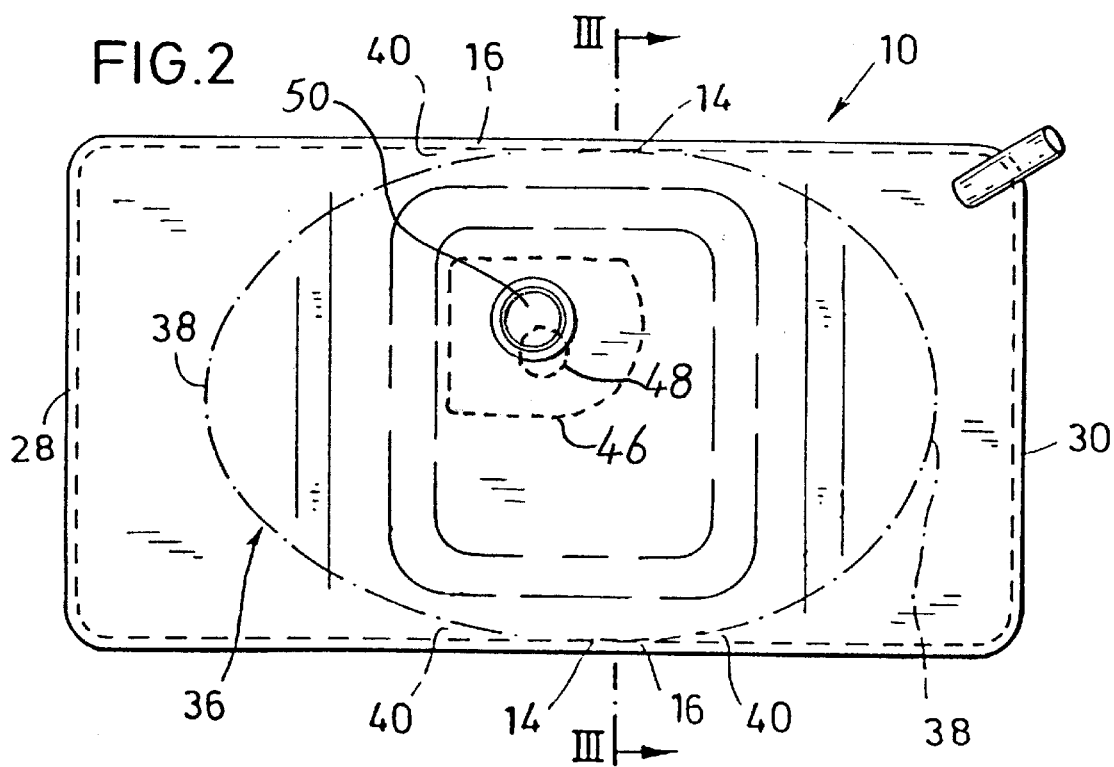

FUEL TANK

CROSS-REFERENCE TO RELATED APPLICATIONS

This application is a continuation-in-part of application Ser. No. 09/116,756, filed on Jul. 16, 1998, now abandoned, which application is incorporated herein in its entirety.

FIELD OF THE INVENTION

The invention concerns a fuel tank for a motor vehicle.

BACKGROUND OF THE INVENTION

The movements of a motor vehicle which occur when it is traveling mean that fuel in the vehicle tank is constantly in motion, and such movements can result in noise which is perceived as being a nuisance, in particular in acceleration and braking phases. Admittedly, fuel tanks may be provided with internal installation components which damp the movements of the fuel, but that is essentially for the purpose of keeping an adequate amount of fuel in the region of the discharge opening of the tank, under all travel conditions which occur in a practical situation, in order in that way to ensure an uninterrupted supply of fuel to the engine, even when the tank is less than full. Those components in the form of for example calming or surge-resistant pots, rings or the like are however of comparatively small dimensions in relation to the cross-sectional area of the tank so that the major part of the cross-sectional area of the tank remains free and thus a surge movement in the tank in the direction of travel of the vehicle is not substantially damped, for example under vehicle braking. Consequently, when the moving fuel impacts in a more or less unbraked condition and in substantially perpendicular relationship against the wall of the tank, the kinetic energy inherent in the moving fuel results in conversion into sound energy, in particular in those regions in which, upon impact against the tank wall, the fuel cannot escape or can escape only to a slight degree. Such regions of the tank are for example corner regions or other regions which are enclosed on a plurality of sides. It will be appreciated that the distance that the fuel covers within the tank before it impinges against a tank wall also plays a part. For that reason the generation of noise is particularly pronounced in those tanks whose longest extent is parallel to the direction of travel.

Admittedly, to resolve that problem, it has already been proposed that the fuel tank may be provided with a device for absorbing the kinetic energy of the fuel disposed therein, by virtue of a plate-shaped baffle element of plastic material being provided locally at least in an upper corner region of the fuel tank, as in DE 39 05 611 C2. That structure however is comparatively complicated and expensive. In addition it can involve difficulties if the tank is produced in one piece, for example by means of a blow molding process, from plastic material, as is nowadays frequently the case.

SUMMARY OF THE INVENTION

An object of the present invention is to provide a fuel tank for a motor vehicle such that noise caused by surge movements of the fuel is at least substantially reduced.

Another object of the invention is to afford a motor vehicle fuel tank which can at least reduce noise due to fuel surge movements within the tank, using simple means which do not require significantly increased expenditure, which are easy to fit and which, in addition do not noticeably reduce the volume of the tank.

According to the present invention the foregoing and other objects are attained by a fuel tank for a motor vehicle, having a first end and a second end, comprising at least one wall element in the tank interior for reducing fuel surge movement therein, the wall element being arranged within the tank at a spacing from an end of the tank that in the direction of vehicle travel is one of the front end and the rear end respectively. The wall element extends at least over a substantial part of the height and the width of the tank and is of such a shape that its boundary surfaces extend at least predominantly not in planes which extend perpendicularly to said direction of travel. The spacing between the wall element and an adjacent tank wall portion to be shielded thereby is so selected that the volume of the fuel in the respective region between the wall element and said wall portion to be shielded is insufficient to produce undesired sound noises caused by fuel surge movement.

The invention is based on the consideration that, to achieve the desired effect, it is sufficient for the movement of the fuel to be broken, at least shortly before it reaches the respective end wall of the tank, in a manner which results in conversion of the kinetic energy of the fuel into sound energy, only to a slight degree. That can be achieved on the one hand in that the effective boundary surfaces of the respective surge-reducing wall element, at least in portions, extend at an acute angle relative to the direction of travel of the vehicle in which the tank is fitted, in such a way that the fuel which encounters those surfaces at a corresponding angle is deflected, while in any case a part of the fuel flows through the remaining free cross-sectional areas between the wall element and the respectively adjacent region of the wall of the tank, a part of the kinetic energy of the fuel being additionally consumed and dissipated by virtue of the increased flow resistance which occurs in that situation. In that respect it is further possible and possibly desirable for the wall element or installation component inside the tank to be provided with openings such as holes, edge recesses or the like, through which a part of the fuel impinging against the component can also pass. Desirably, those openings in the component can be positioned in the regions at which the fuel, on hitting against the surge-reducing component, finds only few possible ways of escaping, for example, in the case of a component extending in an arcuate configuration, at the apex of the arc which is generally at the center of the component, where the fuel flows which come from both sides in the course of a surge movement come together.

In a preferred feature of the invention the component constituting the wall element may be formed by a ring member or a short, closed profile portion, for example a tube portion, the longitudinal axis of which extends substantially perpendicularly to the direction of travel and thus vertically when the tank is of the usual design configuration. In that arrangement, each half of the tube portion can represent a respective wall element which shields an adjoining region of the wall of the tank.

Such a ring member or tube portion can generally be loosely fitted into the tank. When made from elastic plastic material, there is the possibility that it can be introduced into the tank, possibly in a compressed condition, through a relatively small opening in the wall of the tank. In that respect, depending on the topography of the tank, it will frequently be possible to forego the adoption of particular means for fixing the ring member or tube portion in position, especially as in many cases the tube portion must be adapted at its ends to the configuration of the adjoining parts of the tank, that is to say for example the shape of the bottom wall and/or the top wall thereof, so that inevitably there are positively locking connections between the tank and the tube portion, which hold the tube portion in its position in the tank.

In addition there is also the possibility that the tube portion, or an installation component of another configuration, can not only be introduced into the tank in a condition of being prestressed to a certain degree, but it can also be arranged therein for example in such a way that the diameter of the tube portion in the non-loaded condition is somewhat larger than corresponds to the width or other corresponding dimension of the tank. In that case the tube portion experiences a certain degree of elastic deformation that results in an ellipse-like shape or another shape, that differ from that of a circular ring.

In regard to the arrangement and configuration of the component, the important consideration, irrespective of the configuration and number thereof, is that the component extends at such a small spacing from the respectively associated end of the tank that the amount of fuel which is between the component and the adjacent end of the tank and which also participates in the fuel surge movements by virtue of the movements performed by the vehicle when traveling along is too small for the kinetic energy inherent therein to be sufficient to generate a troublesome noise. A tube portion which is shaped as an ellipse or the like can better fulfill those conditions under some circumstances than a tube portion of circular cross-section if its longer axis extends substantially parallel to the direction of travel, as in that case the two arcuate portions which are each associated with a respective one of the two ends of the tank are disposed at a shorter spacing from that end.

It may however also be desirable, instead of a hollow one-piece component, to provide at least two separate wall elements, each of which is arranged near one of the ends of the tank, being the ends that are at the front or the rear respectively in the direction of travel. In that case each of the two wall elements can form the portion of a circular ring, or it can be of some other curved configuration or it may be of a polygonal configuration. It will be noted that, when using individual wall elements, under some circumstances, particular securing means may have to be provided in order to hold the elements in their positions, although that does not require complicated and expensive precautionary steps to be taken, in consideration of the curved configuration thereof and the resulting three-dimensional shape. For example projections or recesses can possibly be integrally formed in the wall of the tank, to serve as a positively locking seat for accommodating the end regions of such a wall element.

Elastic deformability of the tube portion or a component of another configuration can provide that the component also deforms under the effect of the kinetic energy of the fuel impinging there against. However, that would not represent a disadvantage as a part of the kinetic energy of the moving fuel would be absorbed by the elastic deformation of the component. Admittedly, the elasticity of the component would inevitably mean that, after the effect of the moving fuel thereon was concluded, the component would spring back into its original configuration. However the movements transmitted thereby to the fuel would be so slight that under no circumstances could they result in a noise that would be perceived as being a nuisance.

If it is assumed that the lateral boundary walls of the tank, at least in portions thereof, extend substantially parallel to the direction of travel and consequently, when using a tube portion as the surge-reducing wall element, those wall portions of the tank extend in the manner of a tangent in relation to the tube portion or to another curved wall-like element, then acute-angled, wedge-shaped spaces are formed adjacent the regions of contact between the tank wall and the surge-reducing wall element or, if there is no contact, adjacent the two lateral apex regions for example of the tube portion. Unless particular precautions are taken, those spaces may allow the fuel, on moving into such a space, only little possibility of escaping therefrom. It is therefore desirable for the arrangement to be such that those regions are at the side of the wall element, being the side which faces towards the respective end of the tank. When using for example a tube portion or surge-reducing components which are curved in an arcuate configuration, the spacing between the adjacent end of the tank and the component is then at its shortest in the central region thereof, that is to say for example in the apex region. In this respect it can in any case be desirable to leave free a passage for the fuel between the component and the side walls of the tank, with the cross-sectional dimensions of the passage for the fuel being so selected that on the one hand, when the fuel passes therethrough, a noticeable amount of kinetic energy is removed by virtue of the increased flow resistance, but on the other hand the amount of fuel that can pass through is not such that undesirable noise occurs at any location.

In addition the surge-reducing wall element or component can also extend inclinedly in such a way that it includes an acute angle with the bottom wall and/or the top wall of the tank so that as a result the fuel additionally experiences a change in the direction of its movement. In that case, care is then possibly also to be taken to ensure that the free cross-sections remaining at the bottom wall and at the top wall are sufficient to prevent the fuel from impinging against the wall element, in such a way as to generate noise.

Further objects, features and advantages of the invention will be apparent from the following description of preferred embodiments.

BRIEF DESCRIPTION OF THE DRAWINGS

FIG. 2 is a view similar to FIG. 1B of a second embodiment of a fuel tank, FIG. 3 is a view similar to FIG. 1A of a third embodiment of a fuel tank.

DESCRIPTION OF PREFERRED EMBODIMENTS

Figure 1A:
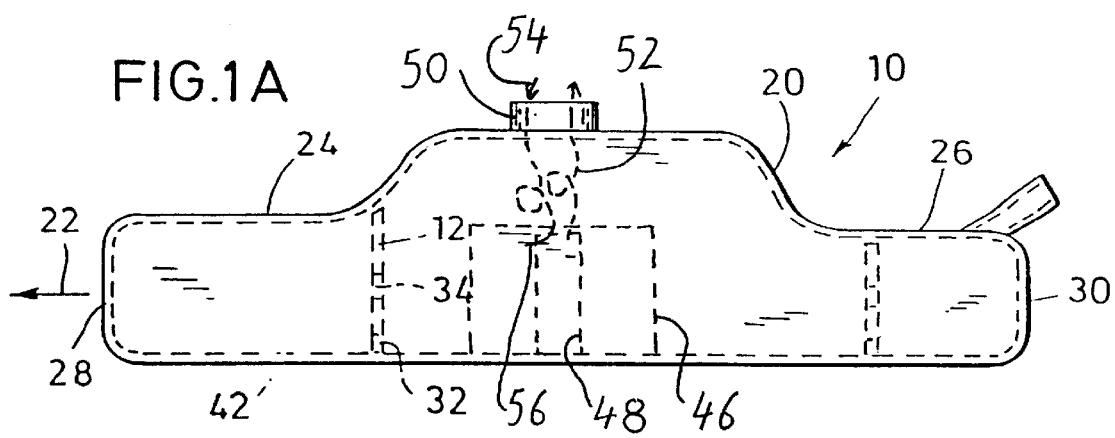
FIG. 1A is a side view of a fuel tank to be fitted into a motor vehicle.
Figure 1B:
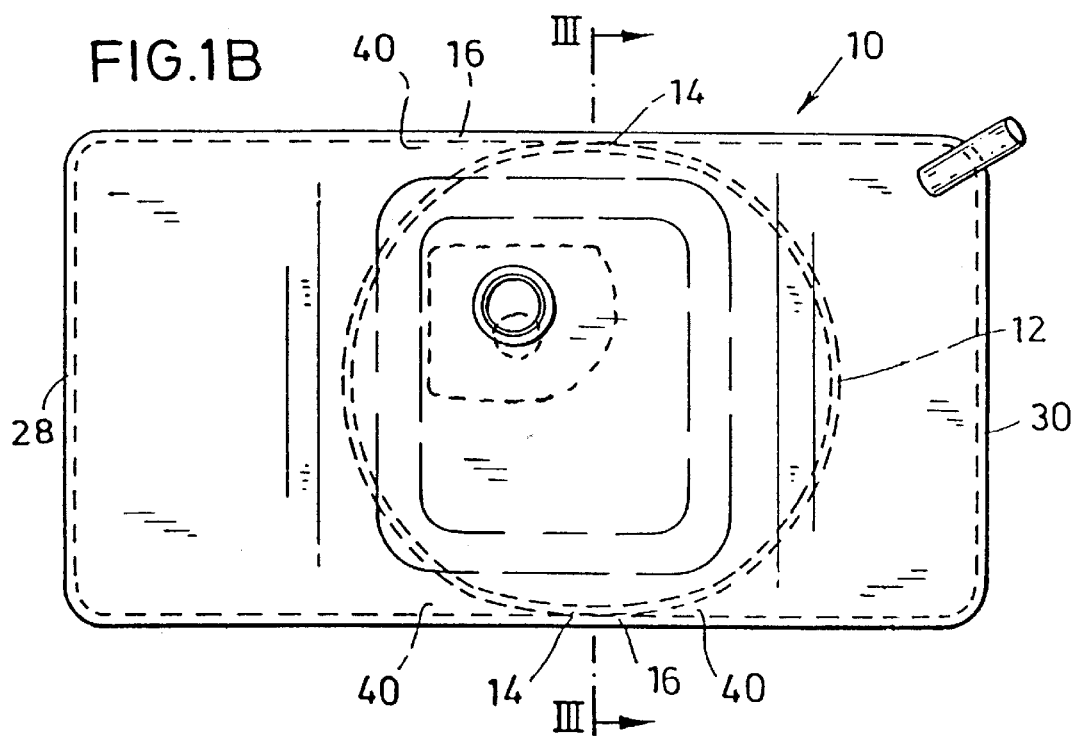
FIG. 1B is a plan view of the FIG. 1A fuel tank.
Figure 1C:
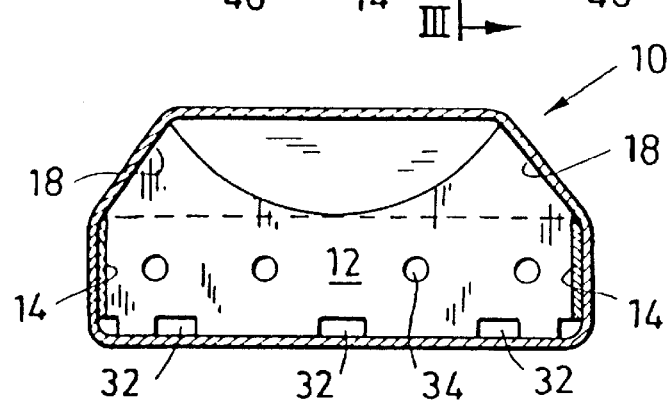
FIG. 1C is a view in section taken along line III—III in FIG. 1B, omitting a surge pot.

Referring firstly to FIGS. 1A through 1C the fuel tank 10 for a motor vehicle as shown therein is of a substantially rectangular configuration in plan although this is not a necessary requirement for use of the invention. This applies in particular if the fuel tank 10 is integrally produced from thermoplastic material, for example by a blow molding process. In that case the configuration of the tank 10 is governed by the space available for the tank in the vehicle.

A surge-reducing installation comprising a surge-reducing component shown here more specifically and by way of example in the form of a tube portion 12 of circular cross-section is arranged in the central region of the tank in such a way that its longitudinal axis extends substantially vertically, wherein its diameter approximately corresponds to the width of the tank 10 and the tube portion 12 thus bears with two lateral apex regions 14 against the respective side walls 16 of the tank 10. At the top side, for the purposes of adaptation to the topography of the tank which can be seen in particular from FIGS. 1A and 1C, the tube portion 12 is provided with cut-out portions or recesses indicated at 18 in FIG. 1C, whose configuration is adapted to the configuration of the top wall 20. The tube portion 12 is substantially cylindrical and is arranged in the central region of the tank 10 which at the top projects upwardly relative to the tank regions 24 and 26 which are at the front and at the rear respectively in the direction of travel 22, of the vehicle in which the tank 10 is fitted, although none of these features is specifically required for the purposes of the present invention.

As already stated, the tube portion 12 is matched to the internal configuration of the tank 10, in particular in regard to the upper boundaries of the tube portion 12 with the cut-out portions 18, without however the tube portion being accurately fitted into the tank. That is also not necessary in order to attain the desired purpose, as the important consideration is to ensure that, upon movement of the fuel in the tank in the direction of travel 22 or in the opposite direction thereto, the fuel in the central region of the tank cannot unimpededly flow into the end regions 24 and 26 of the tank and then impact against the end boundary walls 28 and 30 respectively, resulting in the undesirable generation of noise. It will be appreciated on the other hand that the through-flow of fuel between the central region and the two end regions 24 and 26 is not to be impeded, under normal operating conditions. For that reason, the tube portion 12 is also provided with openings shown in the form of edge recesses 32 at the lower end and with openings 34 in the central region, which in any case provide the fuel with a passage for flow therethrough, but which, in the event of strong surge movements of the fuel, consume and dissipate apart of the kinetic energy, by virtue of the high flow resistance offered.

With the specified configuration of the tank and the tube portion, it is also not necessary to provide particular securing means for the tube portion 12 as, even if the tube portion terminates for example at its upper end at a short distance from the respective oppositely disposed region of the top wall 20, the tube portion 12 is in any case secured in position in the tank. In any case, small movements of a few millimeters do not cause any problems, as long as those movements do not generate undesirable noise. In general however that will anyway not be the case if both the tank 10 and also the tube portion 12 comprise thermoplastic material.

In spite of the presence of the surge-reducing component or tube portion 12, in the event of severe acceleration or severe deceleration, the amount of fuel in the front and rear regions 24 and 26 respectively of the tank, outside the region enclosed by the tube portion 12, will impact in the usual way against the respectively associated end face 28 and 30 respectively. As however that amount of fuel is substantially smaller than the total amount of fuel in the tank at the respective degree of filling thereof, the amount of noise generated is also correspondingly less. Therefore, in each individual situation it will be important to establish by suitable tests, how large the regions 24 and 26 which are respectively disposed in front of and behind the tube portion 12 outside the tube portion which subdivides the tank may be, so that the desired effect is still achieved. In that respect, a consideration to be borne in mind is also the distance that the fuel in the front region and the rear region respectively can still unimpededly cover, in the direction of travel 22 or in the opposite direction thereto.

If, in the case of a for example relatively long but narrow tank 10, a tube portion 12 which is of a more or less cylindrical configuration leaves excessively large volumes free in the end regions, it is possible for the tube portion to be of a substantially elliptical configuration, similar to the configuration 36 indicated in dash-dotted line in FIG. 2, whereby the free spaces of the end regions 24 and 26 are noticeably reduced, as FIG. 2 in particular shows. In this case also it would be possible to use a tube portion 12 of elastic plastic material, which is then put within the tank into the appropriate shape in which it is then held in a prestressed condition. In general, when dealing with a one-piece tank 10, the introduction of a tube portion 12 of that kind or also a tube portion of another configuration or some other wall element does not represent a very serious problem as the tank must in any case be provided with an opening which possibly has to be permanently closed again, in order to be able to mount in the tank the elements which are required for operation of the motor vehicle, for example pumps, filling level display devices and so forth.

On the other hand however, there is also the possibility that, when the tank is produced by a blow molding process, the tube portion 12 or other surge-reducing component can be introduced in the usual manner in such a production process into the preform from which the tank is produced by being expanded, so that there is no need for that component to be subsequently introduced into the tank. In that case, if the surge-reducing component comprises a material which is weldable to the material forming the tank 10, that component can also be secured to the tank wall by a welded join at the same time when producing the tank in the blow molding mold.

As, both when using a cylindrical tube portion and also when using an elliptical tube portion, in the event of acceleration or deceleration, the amounts of fuel which flow in the region within the tube portion in a direction towards the respective end wall, are guided towards the center, that is to say into the apex region 38 of the tube portion, which is at the front or at the rear respectively in the direction of travel 22, with the result that two main flows come together at that location, it may be desirable, in particular in those apex regions, to provide openings 34 in the wall of the tube portion so that a part of that fuel can escape. In that case the size of those openings 34 must be such that not too much fuel flows into the front or rear region 24, 26 respectively and the amount of fuel there is not markedly increased during the movement towards the respective end wall 28 or 30. In this case also this can be established by a few simple tests.

On the other hand however it may also be desirable to provide, near the lateral apex regions of the tube portion, openings which permit a smaller amount of fuel to pass therethrough, per unit of time. In that respect, the situation does not so much involve the proportion of fuel which is within the tube portion 12, as the proportion of fuel which is in the front or rear region 24 or 26 respectively, if that proportion of fuel performs a movement which is directed away from the respective end wall 28 and 30 respectively and at the end of which it impinges against the wall part of the tube portion, which defines the respective region 24 or 26 respectively of the tank. Here there could be the danger that, even when relatively small amounts of fuel are involved, a noticeable amount of noise may be generated as the fuel in the region 24 or 26 of the tank flows in approximate halves into the constricting wedge-shaped regions indicated at 40 in FIG. 2 where it has little possibility of escaping therefrom. A substantial advantage of this and also other embodiments of the invention is precisely that those regions which are defined by a plurality of sides and which do not allow the fuel any possibility of escape are not present in the main region of the tank, which is enclosed by the respective tube portion. In this case also, on the basis for example of the dimensions and configuration in FIG. 2, an elliptical tube portion could be more desirable as, if suitable dimensions are adopted, that tube portion so reduces the volume in the two end regions 24 and 26 respectively that the amounts of fuel which flow into the wedge-shaped regions 40 are too small for them to generate a troublesome noise when the fuel impacts against the wall portions of the tank at those locations.

It is moreover also possible for the tube portion to be of such a configuration that it enlarges in an approximately conical shape in the direction of its longitudinal axis, as is indicated by dash-dotted lines at 42 in FIG. 3. Here, the fuel within the tube portion would be additionally guided towards the upper boundary wall 20 of the tank 10. Which of those configurations is the respective optimum one will be based on the configuration of the fuel tank 10 whose side walls and top and bottom walls may extend in a highly irregular and nonuniform manner, unlike the embodiments illustrated in the drawing.

There is provided within the respective tube portion 12, 36, 42 a surge pot 46 provided with a pump 48 or other means for preventing the movements of the fuel, that is to say for example those devices which, in any traveling condition of the vehicle, always keep a minimum amount of fuel in the region of the discharge opening so that the supply of fuel is not interrupted, even when vehicles are in a position of extreme inclination or when vehicles are for example negotiating long curves or bends when the fuel tends to be displaced by centrifugal forces. As shown in the drawings, the discharge opening is in the top of the tank, and is closed by a cap or other closure means 50, through which pass two tubes 52 and 54. The pump 48 is connected to one tube 52, for the supply of fuel from the tank to an engine of the vehicle. As is usual, the pump 48 delivers more fuel than is consumed by the engine. The surplus fuel is returned to the fuel tank via the other tube 54, the open end 56 of which is arranged to discharge into the interior of the surge pot.

Figure 4:
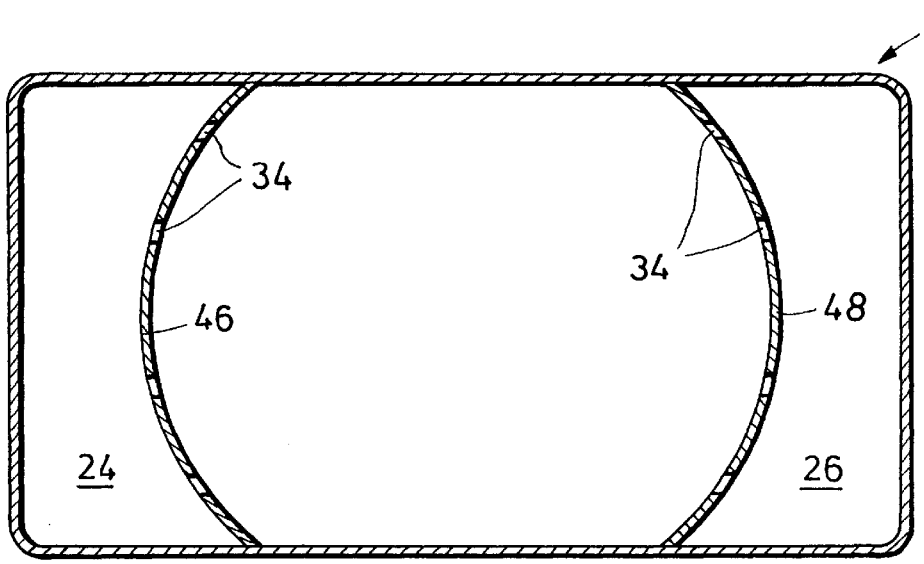
FIG. 4 is a highly diagrammatic view in horizontal section through a fourth embodiment of a fuel tank.

That also applies in regard to the embodiments shown in FIGS. 4 through 6 to which reference will now be made and of which FIG. 4 shows an embodiment in which there are provided two surge-reducing wall elements 46, 48 which each form a respective portion of a circular arc. In this case, in regard to the configuration involved and the division of the individual regions formed in the tank 10 by the wall elements fitted therein, this arrangement affords a greater degree of design freedom than when a one-piece tube portion is used. In particular it is possible for the volumes in the end regions 24,26 to be freely selected in dependence on the location at which the individual portions 46, 48 are installed. It is also the case here that openings 34 and edge recesses may be provided in the installed components 46,48 in order to provide additional possible ways for the fuel to escape, in particular where the flows of fuel are concentrated under the influence of acceleration or deceleration or flow into regions which are defined by a plurality of sides.

Figure 5:
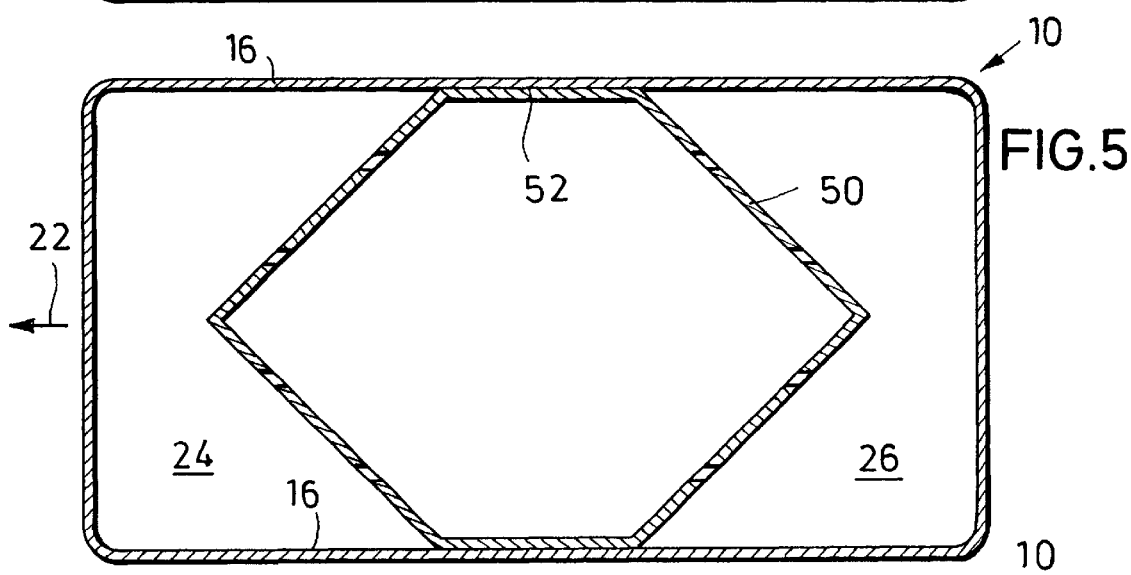
FIG. 5 is a view corresponding to FIG. 4 of a fifth embodiment.

In the case of the tank shown in FIG. 5 the wall element 50 is again in one piece but it is in the form of an angular profile portion, comprising wall regions 52 which are joined to the tank side walls 16 and extend substantially parallel to the direction of travel 22. This means that the volume of the respective end region 24,26 of the tank 10 can be selected in dependence on the lengths of the wall regions 52.

Figure 6:
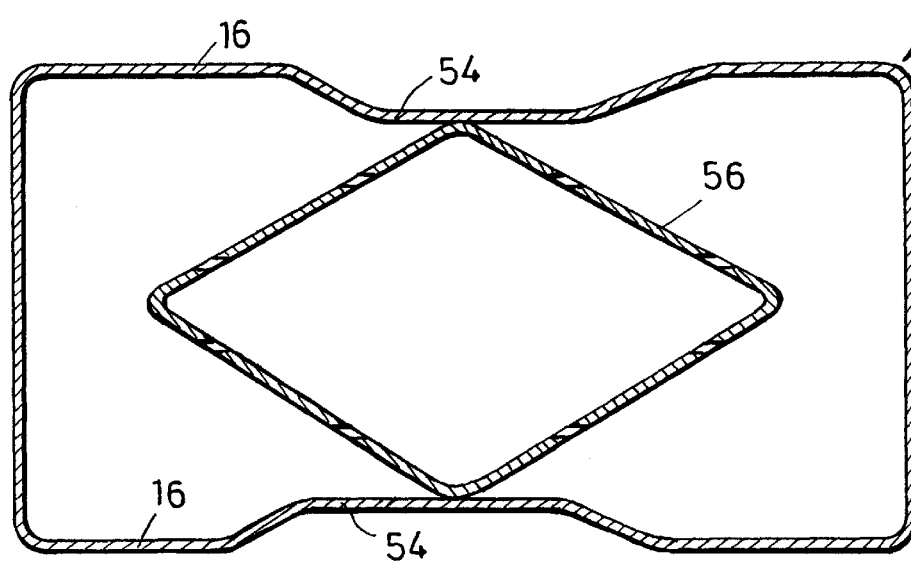
FIG. 6 is a view corresponding to FIG. 4 of a sixth embodiment.

In the embodiment shown in FIG. 6 the tank 10 is somewhat narrower and moreover is provided with inwardly extending constriction portions 54 in the side walls 16, wherein once again the tank has an installed component 56 in the form of a closed profile portion which is of a substantially rhomboidal configuration.

Figure 7A:
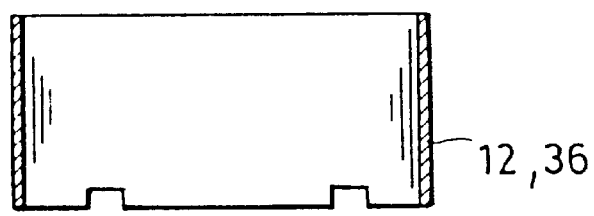
FIGS. 7A through 7E are views in longitudinal section of various further embodiments of components.
Figure 7B:
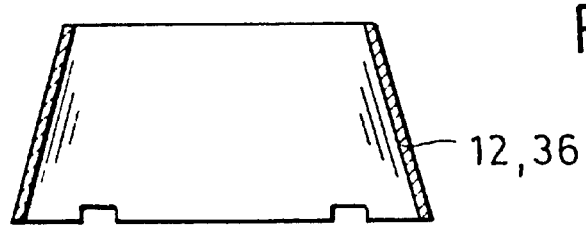
Figure 7C:
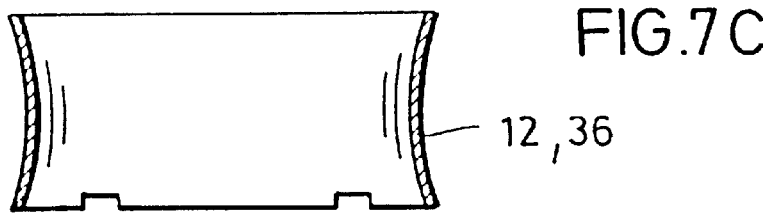
Figure 7D:
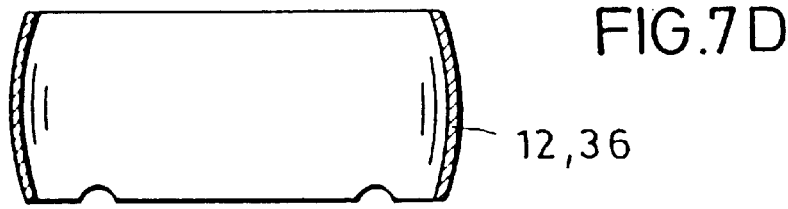
Figure 7E:
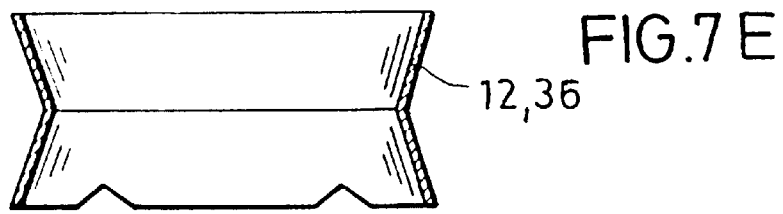

FIGS. 7A through 7E show further possible embodiments of the tube portion or other component, each of these Figures showing a view in longitudinal section through a one-piece component. It will be appreciated that the illustrated shapes and configurations could also be used in connection with separate wall elements as shown at 46 and 48 in FIG. 4, possibly also in such a way that a component for example as shown in FIG. 7C is associated with the one end region of the tank and a component as shown in FIG. 7E is associated with the other end region, depending on the design configuration of the tank. In the case of tanks which are of an extremely irregular configuration, that could in any case be an advantage of the two-part arrangement as shown in FIG. 4, as it permits a greater degree of design freedom.

In regard to the specific design configurations of the different wall elements attention is directed to FIGS. 7A through 7E from which the various shapes of these embodiments of the wall elements will be already apparent.

Components of a more complicated configuration could possibly also be produced in one piece by a blow molding process and subsequently put into the respectively required configuration, by simple post-treatment thereof. At any event the invention affords the possibility of designing the configuration of the actual tank, irrespective of considerations which are related to the generation of noise, without a significant increase in expenditure being required for the measures that are necessary to reduce the noise level.

It will be appreciated that the above-described structures according to the invention have been set forth solely by way of example and illustration thereof and that various other modifications and alterations may be made therein without departing from the spirit and scope of the invention.

What is claimed is:

1. A fuel tank for a motor vehicle, said fuel tank comprising:
   a first end and a second end that in the direction of vehicle travel are a front end and a rear end respectively;
   two wall elements in the tank interior for reducing fuel surge movement therein, the wall elements being arranged within the tank at a spacing from said ends of the tank and extending at least over the major part of the height and the width of the tank and being of such a shape that their boundary surfaces extend across the tank at least predominantly not in planes which extend perpendicularly to said direction of travel;
   a discharge opening within the wall elements; and
   a surge pot within the wall elements in the vicinity of the discharge opening.

2. A fuel tank as set forth in claim 1 wherein the wall elements are of a curved configuration in a plane which is parallel to the direction of travel.

3. A fuel tank as set forth in claim 2 wherein said plane extends horizontally.

4. A fuel tank as set forth in claim 1 wherein the wall elements are provided with openings.

5. A fuel tank as set forth in claim 4 wherein said openings are holes in said wall elements.

6. A fuel tank as set forth in claim 4 wherein said openings are edge recesses in said wall elements.

7. A fuel tank as set forth in claim 1 comprising
a respective surge-reducing component constituting each of said two wall elements operatively associated with each of said front end and said rear end of said tank.

8. A fuel tank as set forth in claim 1, wherein the two wall elements are constituted by a single surge-reducing component.

9. A fuel tank as set forth in claim 8, wherein said profile portion is a tube portion having a longitudinal axis which extends substantially perpendicularly to said direction of travel.

10. A fuel tank as set forth in claim 8, wherein the surge-reducing component is arranged loosely in the fuel tank.

11. A fuel tank as set forth in claim 8, wherein the surge-reducing component is produced in one piece in a blow molding process from thermoplastic material.

12. A fuel tank as set forth in claim 1, wherein the wall elements comprise elastic material.

13. A fuel tank as set forth in claim 1, wherein the wall elements comprise plastic material.

14. A fuel tank as set forth in claim 1 wherein the wall elements are adapted to the contours of the tank.

15. A fuel tank as set forth in claim 1 wherein the wall elements are introduced into the fuel tank in the production thereof.

16. A fuel tank as set forth in claim 15 wherein the wall elements at least partially comprise a material which is weldable to the material of which the tank at least partially consists, and are secured to the wall of the tank by means of a welded join during production of the tank.

17. A fuel tank as set forth in claim 15 wherein said material of the wall elements is thermoplastic material.

18. A fuel tank as set forth in claim 17 wherein the tank has a bottom wall and the wall elements are connected to the bottom wall of the fuel tank.

19. A fuel tank as set forth in claim 17 wherein the tank has at least one side wall and the wall elements are connected to said at least one side wall of the tank.

20. A fuel tank for a motor vehicle, said fuel tank comprising:

a first end and a second end that in the direction of vehicle travel are a front end and a rear end respectively;

two wall elements in the tank interior for reducing fuel surge movement therein, the wall elements being arranged within the tank at a spacing from said ends of the tank and extending at least over the major part of the height and the width of the tank and being of such a shape that their boundary surfaces extend across the tank at least predominantly not in planes which extend perpendicularly to said direction of travel;

a discharge opening within the wall elements; and a surge pot within the wall elements in the vicinity of the discharge opening;

wherein the wall elements are of a curved configuration in a plane which is parallel to the direction of travel; and wherein the wall elements and respective adjacent wall portions of the fuel tank meet at an acute angle at the side of the respective wall element that is towards the nearer of said front end and said rear end of said tank.

21. A fuel tank for a motor vehicle, said fuel tank comprising:

a first end and a second end that in the direction of vehicle travel are a front end and a rear end respectively;

two wall elements in the tank interior for reducing fuel surge movement therein, the wall elements being arranged within the tank at a spacing from said ends of the tank and extending at least over the major part of the height and the width of the tank and being of such a shape that their boundary surfaces extend across the tank at least predominantly not in planes which extend perpendicularly to said direction of travel;

a discharge opening within the wall elements; and a surge pot within the wall elements in the vicinity of the discharge opening; wherein the two wall elements are constituted by a single surge-reducing component that is arranged in a prestressed condition in the tank.

* * * * *